(12) United States Patent
Meier

(10) Patent No.: US 10,336,357 B2
(45) Date of Patent: Jul. 2, 2019

(54) TRANSPORT CART FOR TRANSPORTING OBJECTS OR ANIMAL CARCASSES

(71) Applicant: Wolfgang Meier, Extertal (DE)

(72) Inventor: Wolfgang Meier, Extertal (DE)

(*) Notice: Subject to any disclaimer, the term of this patent is extended or adjusted under 35 U.S.C. 154(b) by 138 days.

(21) Appl. No.: 15/502,241

(22) PCT Filed: Aug. 13, 2015

(86) PCT No.: PCT/DE2015/000412
§ 371 (c)(1),
(2) Date: Feb. 7, 2017

(87) PCT Pub. No.: WO2016/023537
PCT Pub. Date: Feb. 18, 2016

(65) Prior Publication Data
US 2017/0232990 A1    Aug. 17, 2017

(30) Foreign Application Priority Data
Aug. 15, 2014   (DE) .......................... 10 2014 012 313

(51) Int. Cl.
*B62B 3/04* (2006.01)
*B62B 5/00* (2006.01)
(Continued)

(52) U.S. Cl.
CPC ............... *B62B 3/04* (2013.01); *A22B 7/006* (2013.01); *B62B 5/003* (2013.01); *B62B 5/0033* (2013.01);
(Continued)

(58) Field of Classification Search
CPC ......... B62B 3/04; B62B 5/003; B62B 5/0033; B62B 5/06; B62B 5/087; B62B 2202/42;
(Continued)

(56) References Cited

U.S. PATENT DOCUMENTS 1,124,414 A  *  1/1915  Gilliam ............... A01D 87/122
                                                           198/308.1
2,360,799 A  *  10/1944  Slingsby .................. B62B 3/04
                                                           126/298
(Continued)

FOREIGN PATENT DOCUMENTS

| DE | 200 06 027 U1 | 6/2000 | |
|----|---------------|--------|---|
| DE | 20 2013 007716 U1 | 9/2013 | |
| EP | 1 630 063 A1 | 3/2006 | |
| FR | 2423973 A1 * | 11/1979 | ............. A01D 87/02 |
| MY | 138313 A * | 5/2009 | |

OTHER PUBLICATIONS

International Search Report of PCT/DE2015/000412, dated Nov. 25, 2015.

*Primary Examiner* — Glenn F Myers
(74) *Attorney, Agent, or Firm* — Collard & Roe, P.C.

(57) ABSTRACT

A transport cart and a method using a transport cart transports objects or animal carcasses. The transport cart has a loading trough which has a region which is arranged on a side of the loading trough facing away from a handlebar and/or from at least one handle, wherein the region has at least one loading and/or unloading device, thus making loading and/or unloading possible such that the object which is to be transported or the transported object or the animal carcass which is to be transported or the transported animal carcass does not have to be touched by an operator.

21 Claims, 3 Drawing Sheets

Figure 1:
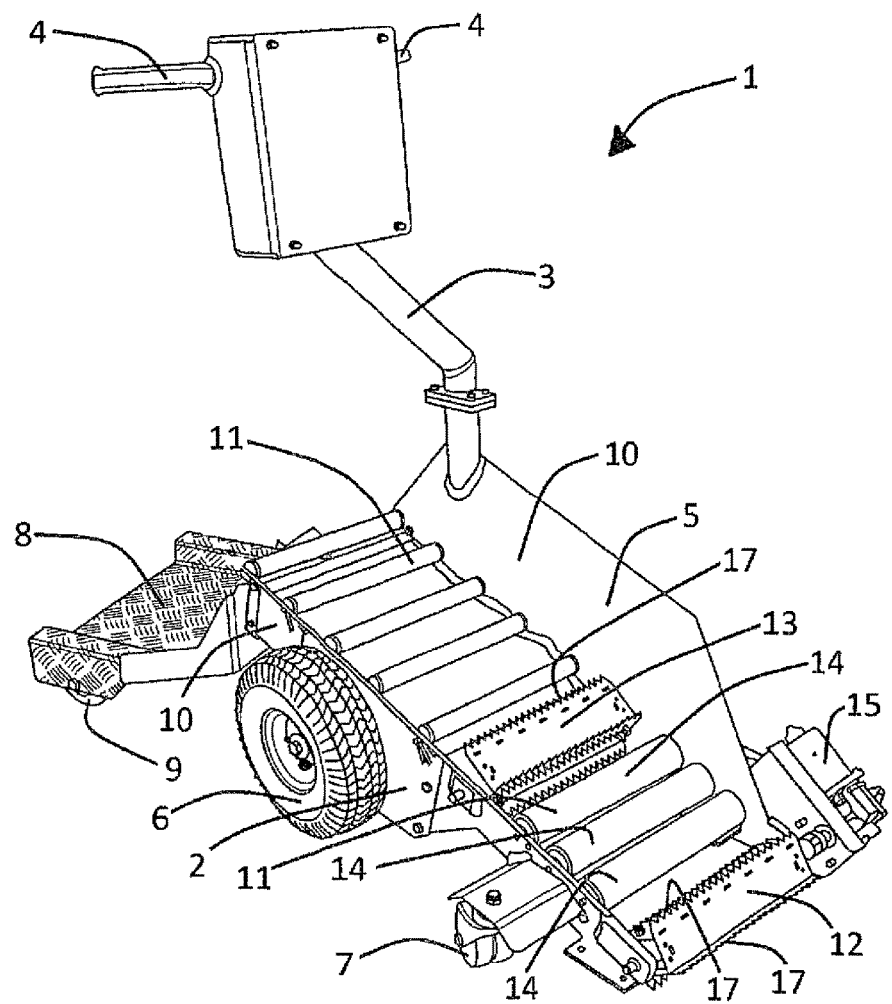

(51) Int. Cl.
*A22B 7/00* (2006.01)
*B62B 5/06* (2006.01)
*B62B 5/08* (2006.01)

(52) U.S. Cl.
CPC ............... *B62B 5/06* (2013.01); *B62B 5/087* (2013.01); *B62B 2202/42* (2013.01); *B62B 2203/74* (2013.01)

(58) Field of Classification Search
CPC ... B62B 2203/72; B62B 2203/74; B62B 1/18; B62B 3/0625; B62B 3/0612; B62B 3/06; B62B 3/002; B62B 1/22; B62B 2203/70; B60P 1/52; B60P 3/04; B60P 1/4407; A01D 90/02; A01D 90/10; A01D 90/12; A01D 90/16; A01D 89/001; A01D 89/002; A01D 45/001; A01D 45/028; A01D 57/28; A01D 57/30; A01D 87/12; A01D 87/122; A01D 87/0084; A01D 87/0076; A01D 87/0053; A01D 87/0038; A01D 2090/086; A01D 90/08; A01D 90/083; A01M 31/006
See application file for complete search history.

(56) References Cited

U.S. PATENT DOCUMENTS

| | | | | |
|---|---|---|---|---|
| 2,675,934 A * | 4/1954 | Kennedy | ................... | B60P 1/52 410/32 |
| 3,341,039 A * | 9/1967 | Cranage | ................ | A01D 90/08 198/304 |
| 3,539,067 A * | 11/1970 | David | ................... | A01D 90/08 198/632 |
| 3,687,322 A * | 8/1972 | Stieren | ................... | A01D 90/02 198/313 |
| 3,722,722 A * | 3/1973 | Blair | ...................... | A01D 90/08 198/518 |
| 4,052,080 A | 10/1977 | Hedderich et al. | | |
| 5,235,798 A * | 8/1993 | Giardina | ................ | A01D 90/02 56/16.6 |
| 5,620,193 A | 4/1997 | Dschaak | | |
| 5,690,465 A * | 11/1997 | Ledwell | ................... | B60P 1/26 414/408 |
| 6,604,749 B2 * | 8/2003 | Woodbury | ............. | A22B 7/006 280/47.35 |
| 8,734,077 B2 * | 5/2014 | Kelderman | .......... | A01D 85/005 414/111 |
| 8,757,639 B2 * | 6/2014 | Graffis | ..................... | B62B 1/12 280/30 |
| 2007/0194560 A1 | 8/2007 | Zink | | |

* cited by examiner

TRANSPORT CART FOR TRANSPORTING OBJECTS OR ANIMAL CARCASSES

CROSS REFERENCE TO RELATED APPLICATIONS

This application is the National Stage of PCT/DE2015/000412 filed on Aug. 13, 2015, which claims priority under 35 U.S.C. § 119 of German Application No. 10 2014 012 313.8 filed on Aug. 15, 2014, the disclosure of which is incorporated by reference. The international application under PCT article 21(2) was not published in English.

STATE OF THE ART

The invention proceeds from a transport cart and a method for transporting objects or animal carcasses by means of a transport cart.

Transport carts, as described for example in US Patent application publication US 2007/0194560 A1, are two-wheeled or multi-wheeled wagons that serve for transport of objects, animals or carcasses. In particular, a hand truck is known as a two- wheeled transport cart, which has a base frame (framework), at the lower end of which a rigid wheel axle with two wheels and a support that projects forward, which simultaneously serves as a foot and is generally configured as a holding plate, are disposed. To accommodate transported goods, the support is pushed under the transported goods, and subsequently, the hand truck is pivoted about the wheels in order to lift the transported goods off the ground. However, it is a disadvantage that depending on the weight of the transported goods, the use of significant muscle power is required, for example in order to push the support under the transported goods by lifting the transported goods on at least one side.

Hand trucks are also very frequently used in agriculture. In this regard, they are also used as what are called carcass carts, so that they serve for the transport of dead animals, for example from a barn. Handcarts, especially for removing animal carcasses, particularly pig carcasses from a sow barn, are known from the utility model DE 200 06 027 U1, U.S. Pat. No. 4,052,080 A, and U.S. Pat. No. 5,620,193 A, in which handcart a rope winch disposed on the support frame serves for pulling an animal carcass suspended on the rope onto a support disposed at an incline and onto the support frame. However, in order to pull the carcass onto the handcart using the rope winch, significant muscle power of the operator is also required. For this reason, carcass carts that have an electrically driven rope winch have also come into existence in the meantime. Furthermore, hand trucks that have an electrical travel drive are already known, so that transport is also facilitated for the operator. However, it is a disadvantage that the operator must touch the carcass in order to affix the rope on the carcass, and this is considered problematical for hygiene reasons.

THE INVENTION AND ITS ADVANTAGES

The transport cart according to the invention, and the method according to the invention, for transporting objects or animal carcasses by means of a transport cart, have the advantage, in comparison, that the transport cart has a loading trough with a bottom that has a region that is disposed on a side of the loading trough facing away from a handlebar or at least one handle and extends to a front end of the loading trough, wherein the region has at least one loading and/or unloading apparatus—forming a part of the bottom of the loading trough—which is rotatable in both directions, and a loading and/or unloading apparatus is arranged on the front end of the loading trough, thereby making loading and/or unloading possible, so that the object to be transported or the transported object or the animal carcass to be transported or the transported animal carcass does not have to be touched by an operator.

According to an advantageous embodiment of the transport cart according to the invention, at least one loading and/or unloading apparatus takes up at least a part of the width of the loading trough.

According to an additional advantageous embodiment of the transport cart according to the invention, at least one loading and/or unloading apparatus has a round or square cross-section.

According to an additional advantageous embodiment of the transport cart according to the invention, at least one loading and/or unloading apparatus is tubular.

According to an additional advantageous embodiment of the transport cart according to the invention, at least one loading and/or unloading apparatus has at least one tine, at least one strip, at least one serrated strip and/or a conveyor belt.

According to an additional advantageous embodiment of the transport cart according to the invention, the at least one loading and/or unloading apparatus has a drive.

According to an advantageous embodiment of the transport cart according to the invention in this regard, the drive has a controller by means of which the direction of rotation and/or the speed of rotation is controllable.

According to an additional advantageous embodiment of the transport cart according to the invention, the drive is an electric motor or internal combustion engine, for example.

According to an additional advantageous embodiment of the transport cart according to the invention, the loading trough has at least one roller (transport roller) that is mounted to as to rotate.

According to an advantageous embodiment of the transport cart according to the invention in this regard, at least one roller takes up at least part of the width of the loading trough.

According to an additional advantageous embodiment of the transport cart according to the invention, the transport cart has a travel drive.

According to an advantageous embodiment of the transport cart according to the invention in this regard, the drive has a controller by means of which the direction of travel and/or the speed of travel can be controlled.

According to an additional advantageous embodiment of the transport cart according to the invention, the drive is an electric motor or an internal combustion engine, for example.

According to an additional advantageous embodiment of the transport cart according to the invention, the transport cart has at least one support wheel (for example a roller) and/or at least one support runner.

According to an advantageous embodiment of the transport cart according to the invention in this regard, the at least one support wheel can pivot about a vertical axis.

According to an additional advantageous embodiment of the transport cart according to the invention, the transport cart has a seating surface and/or a standing surface for an operator.

According to an advantageous embodiment of the transport cart according to the invention in this regard, the seating surface and/or the standing surface are disposed on a trailer that can be coupled with and uncoupled from the framework.

This has the advantage that an operator can travel along with the transport cart, so that he or she does not have to run along behind it.

According to an additional advantageous embodiment of the transport cart according to the invention, the trailer has at least two wheels.

According to an additional advantageous embodiment of the transport cart according to the invention, the transport cart is a carcass cart.

According to an advantageous embodiment of the method according to the invention, for transporting objects or animal carcasses by means of a transport cart that has a framework, at least one axle with at least one wheel each on both sides, in each instance, a handlebar or at least one handle, and a loading trough, wherein the transport cart is driven up to the object to be transported or the animal carcass to be transported to load the loading trough, an operator runs behind the transport cart during transport or stands or sits on the transport cart in order to put into operation a loading apparatus or a loading and unloading apparatus disposed at a front end of the loading trough that is disposed on a side of the loading trough that faces away from the handlebar or the at least one handle, and forms a part of the bottom of the loading trough, in order to load the loading trough, by means of which apparatus the object to be transported or the animal carcass to be transported is automatically conveyed into the loading trough, in order to subsequently start the transport process, and/or the transport cart is driven to an unloading location in order to unload the loading trough, in order to put an unloading apparatus disposed at the front end of the loading trough and forming a part of the bottom of the loading trough or the loading and unloading apparatus into operation for unloading, by means of which apparatus the transported object or the transported animal carcass is automatically conveyed out of the loading trough.

According to an additional advantageous embodiment of the method according to the invention, the object to be transported or the animal carcass to be transported lies on the ground and the loading apparatus or the loading and unloading apparatus is moved between the ground and the object to be transported or the animal carcass to be transported for loading.

According to an additional advantageous embodiment of the method according to the invention, the object to be transported or the animal carcass to be transported is not touched by the operator for loading and/or the transported object or the transported animal carcass is not touched by the operator for unloading.

According to an additional advantageous embodiment of the method according to the invention, the transport cart is a transport cart having some or all of the features described herein.

Further advantages and advantageous embodiments of the invention can be derived from the following description, the drawing, and the claims.

DRAWING

Figure 2:
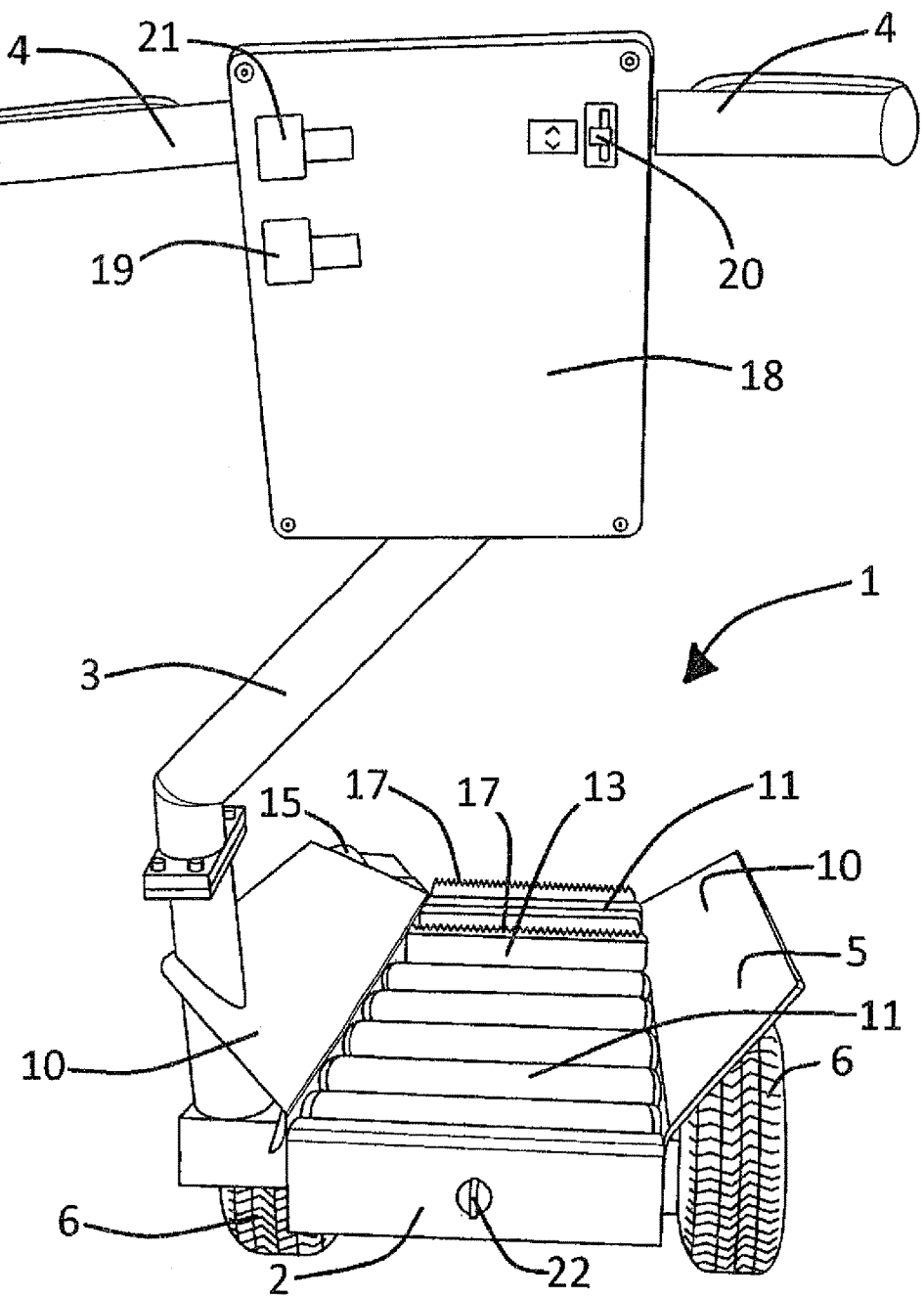

A preferred exemplary embodiment of the object according to the invention is shown in the drawing and will be explained in greater detail below. The drawing shows:

FIG. 1 a perspective view of a transport cart according to the invention,

FIG. 2 a rear view of a transport cart according to the invention, and

Figure 3:
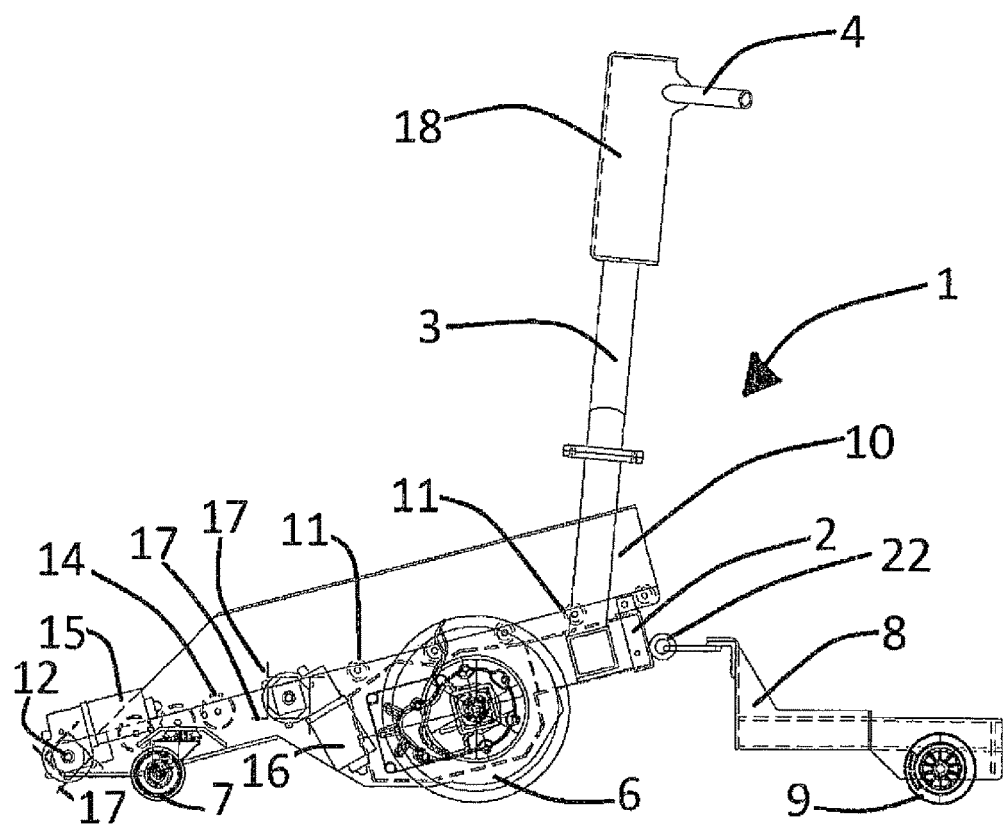

FIG. 3 a side view of a transport cart according to the invention.

DESCRIPTION OF THE EXEMPLARY EMBODIMENT

FIG. 1 shows a perspective view of a transport cart 1 according to the invention. The transport cart 1 has a framework 2 on which a handlebar 3 having handles 4 and a loading trough 5 are disposed. Furthermore, the transport cart 1 has wheels 6 disposed on both sides of an axle. Rollers 7 that are steerable serve for additional support of the transport cart 1, and this makes the transport cart 1 very maneuverable. A trailer 8 that can be coupled and uncoupled and has wheels 9 disposed on both sides of an axle is disposed on the framework 2, on which trailer an operator, not shown, can stand while operating the transport cart 1 in travel operation, for example, while holding the handles 4, which operation is brought about by an electric motor, not shown. Preferably, the trailer 8 has an anti-slip surface (for example a tread plate) in order to guarantee safe standing for the operator.

In order to transport an object or an animal carcass, the loading trough 5 has inclined side walls 10 and a bottom on which rollers 11 are disposed. At the front end of the loading trough 5, there is a loading and/or unloading apparatus 12, which is supported by a loading and/or unloading apparatus 13 and transport rollers 11 disposed in between, which rollers have a rubber coating 14. The loading and/or unloading apparatus 12 can be driven by means of an electric motor 15. Likewise, the loading and/or unloading apparatus 13 can be driven by way of an electric motor 16 shown in FIG. 3. The electric motors 15 and 16 allow rotation of the loading and/or unloading apparatuses 12 and 13 in both directions, so that the loading and/or unloading apparatuses 12 and 13 rotate in the one for loading the loading trough 5, and the loading and/or unloading apparatuses 12 and 13 rotate in the other direction for unloading the loading trough 5. Preferably, the loading and/or unloading apparatuses 12 and 13 are configured to be square and have serrated strips 17 at their corners. the serrated strips 17 offer the advantage that an object lying on the ground or an animal carcass lying on the ground is lifted, so that the transport cart 1 pushes itself between the object or the animal carcass and the ground and/or the object or the animal carcass is pulled into the loading trough 5 during loading of the object or of the animal carcass into the loading trough 5 (if necessary, supported by forward travel of the transport cart 1).

Preferably, the handlebar 3 is disposed asymmetrically on the framework 2, so that the loading trough 5 is open at its end facing away from the loading and/or unloading apparatus 12, thereby also making it possible to transport objects or animal carcasses that are longer than the loading trough 5, using the transport cart 1. To unload the loading trough 5, the loading and/or unloading apparatuses 12 and 13 rotate in the opposite direction, thereby conveying the object or the animal carcass out of the loading trough 5. The loading and/or unloading apparatuses 12 and 13 thereby make it unnecessary for an operator to touch the object or animal carcass to be loaded or unloaded.

FIG. 2 shows a rear view of a transport cart 1 according to the invention. In this regard, the operating console 18, which has an on/off switch 19 for the transport cart 1, a toggle switch 20 for forward and reverse travel operation, and a toggle switch 21 with which the loading and/or unloading apparatuses 12 and 13 are operated, can be seen.

A trailer, not shown, can be coupled with the framework 2 by way of the trailer coupling 22.

FIG. 3 shows a side view of the transport cart 1 according to the invention.

All of the characteristics represented in the description, the following claims, and the drawing can be essential to the invention both individually and in any desired combination with one another.

REFERENCE SYMBOL LIST 1 transport cart
2 framework
3 handlebar
4 handle
5 loading trough
6 wheel
7 roller
8 trailer
9 wheel
10 side wall
11 transport roller
12 loading and/or unloading apparatus
13 loading and/or unloading apparatus
14 rubber coating
15 electric motor
16 electric motor
17 serrated strip
18 operating console
19 on/off switch
20 toggle switch
21 toggle switch
22 trailer coupling

The invention claimed is:

1. Transport cart comprising:
a framework,
at least one axle having at least one wheel each on both sides,
a handlebar and/or at least one handle,
a loading trough having a width, a bottom, a front end, and a sidewall running in the longitudinal direction of the transport cart, the front end having a region that is disposed on a side of the loading trough that faces away from the handlebar and/or the at least one handle,
a seating surface and/or a standing surface for an operator, and
an operating console directly connected to the at least one handle and/or to the handlebar, the operating console comprising at least one operating switch, the operating console being disposed adjacent the seating surface and/or the standing surface such that the operator can operate the at least one operating switch while sitting or standing on the surface,
wherein the region comprises a first loading and/or unloading apparatus having a rectangular cross-section in a longitudinal direction of the transport cart,
wherein the first loading and/or unloading apparatus forms a part of the bottom of the loading trough and can be rotated forwards and backwards,
wherein the first loading and/or unloading apparatus is disposed at the front end of the loading trough, and
wherein the at least one handle or the handlebar is directly connected to the sidewall of the loading trough.

2. Transport cart according to claim 1, wherein the first loading and/or unloading apparatus is tubular.

3. Transport cart according to claim 1, wherein the first loading and/or unloading apparatus has at least one tine, at least one strip, at least one serrated strip and/or a conveyor belt.

4. Transport cart according to claim 1, wherein the first loading and/or unloading apparatus has a drive,
wherein the drive has a controller configured to control a direction of rotation and/or a speed of rotation.

5. Transport cart according to claim 4, wherein the drive is an electric motor or an internal combustion engine.

6. Transport cart according to claim 1, wherein the loading trough further comprises a first roller mounted so as to rotate.

7. Transport cart according to claim 6, wherein the loading trough has a second loading and/or unloading apparatus having a rectangular cross-section in a longitudinal direction of the transport cart,
wherein the second loading and/or unloading apparatus forms a part of the bottom of the loading trough and can be rotated forwards and backwards,
wherein the first roller is disposed between the first loading and/or unloading apparatus and the second loading and/or unloading apparatus, and
wherein the first roller forms a further part of the bottom of the loading trough.

8. Transport cart according to claim 7, further comprising a second roller disposed behind the second loading and/or unloading apparatus in a loading direction, the second roller forming an additional part of the bottom of the loading trough and being mounted so as to rotate.

9. Transport cart according to claim 1, further comprising a travel drive.

10. Transport cart according to claim 9, wherein the travel drive has a controller configured to control the direction of travel and/or speed of travel.

11. Transport cart according to claim 9, wherein the travel drive is an electric motor or an internal combustion engine.

12. Transport cart according to claim 1, further comprising at least one support wheel and/or at least one support runner.

13. Transport cart according to claim 12, further comprising at least one support wheel configured to pivot about a vertical axis.

14. Transport cart according to claim 1, further comprising a trailer configured to be coupled with and uncoupled from the framework,
wherein the seating surface and/or the standing surface are disposed on the trailer.

15. Transport cart according to claim 14, wherein the trailer has at least two wheels.

16. Transport cart according to claim 1, wherein the transport cart has a handlebar disposed asymmetrically on the framework such that the loading trough is open at its end facing away from the first loading and/or unloading apparatus.

17. Method for transporting objects or animal carcasses via a transport cart that comprises
a framework,
at least one axle with one wheel each on both sides, in each instance,
a handlebar and/or at least one handle,
a loading trough having a width, a bottom, a front end, and a sidewall running in the longitudinal direction of the transport cart, the front end having a region that is disposed on a side of the loading trough that faces away from the handlebar and/or the at least one handle,
a seating surface and/or a standing surface for an operator, an operating console directly connected to the at least one handle and/or to the handlebar, the operating console comprising at least one operating switch, the operating console being disposed adjacent the seating surface and and/or the standing surface such that the operator can operate the at least one operating switch while sitting or standing on the surface, and a first loading and/or unloading apparatus having a rectangular cross-section in a longitudinal direction of the transport cart, the first loading and/or unloading apparatus being in the region of the loading trough that faces away from the handlebar and/or the at least one handle, the first loading and/or unloading apparatus forming a part of the bottom of the loading trough and being rotatable forwards and backwards, the first loading and/or unloading apparatus being disposed at the front end of the loading trough, the at least one handle and/or handlebar being directly connected to the sidewall of the loading trough, the method comprising:

driving the transport cart up to the object to be transported or the animal carcass to be transported, rotating the first loading and/or unloading apparatus of the transport cart such that the object or the animal carcass is automatically conveyed into the loading trough, and subsequently starting a transport process by moving the transport cart.

18. Method according to claim 17, wherein the operator stands or sits on the standing surface or the seating surface, respectively, of the transport cart.

19. Method according to claim 17, wherein the object to be transported or the animal carcass to be transported lies on the ground and the first loading and/or unloading apparatus is moved between the ground and the object to be transported or the animal carcass to be transported to help convey the object or the animal carcass into the loading trough.

20. Method according to claim 17, wherein the object to be transported or the animal carcass to be transported is not touched by the operator for loading.

21. Method according to claim 17, further comprising:

driving the transport cart to an unloading location, and operating the first loading and/or unloading apparatus in a reverse direction such that the object or the animal carcass is automatically conveyed via the front end out of the loading trough at the unloading location.

\* \* \* \* \*